(12) United States Patent
Barnes

(10) Patent No.: US 8,814,193 B2
(45) Date of Patent: Aug. 26, 2014

(54) DROP-DOWN BICYCLE TRAILER

(71) Applicant: Matthew John Barnes, Schenectady, NY (US)

(72) Inventor: Matthew John Barnes, Schenectady, NY (US)

( * ) Notice: Subject to any disclaimer, the term of this patent is extended or adjusted under 35 U.S.C. 154(b) by 0 days.

(21) Appl. No.: 13/764,725

(22) Filed: Feb. 11, 2013

(65) Prior Publication Data

US 2014/0084561 A1 Mar. 27, 2014

Related U.S. Application Data

(60) Provisional application No. 61/705,651, filed on Sep. 26, 2012.

(51) Int. Cl.
*B62K 27/12* (2006.01)
*B62K 27/00* (2006.01)

(52) U.S. Cl.
CPC ............... *B62K 27/006* (2013.01); *B62K 27/12* (2013.01)
USPC ............................................ 280/204; 280/78

(58) Field of Classification Search
CPC ...... B62K 27/12; B62K 27/003; B62K 27/02; B62K 27/006; B62K 2710/16
USPC .................................................. 280/204, 78
See application file for complete search history.

(56) References Cited

U.S. PATENT DOCUMENTS

| | | | | |
|---|---|---|---|---|
| 730,193 | A * | 6/1903 | Parker | 280/204 |
| 4,037,853 | A * | 7/1977 | Sparks | 280/204 |
| 4,077,645 | A * | 3/1978 | Dortch et al. | 280/204 |
| 4,342,467 | A * | 8/1982 | Kester | 280/204 |
| 4,725,067 | A * | 2/1988 | Lundy | 280/204 |
| 4,756,541 | A * | 7/1988 | Albitre | 280/204 |
| 4,759,559 | A * | 7/1988 | Moulton | 280/40 |
| 5,005,847 | A * | 4/1991 | King et al. | 280/47.19 |
| 5,076,600 | A * | 12/1991 | Fake | 280/204 |
| 5,098,113 | A * | 3/1992 | Albitre | 280/204 |
| 5,215,318 | A * | 6/1993 | Capraro | 280/1.5 |
| 5,427,396 | A * | 6/1995 | Gore | 280/204 |
| 5,944,333 | A * | 8/1999 | Kent | 280/204 |
| 7,503,574 | B1 * | 3/2009 | Reid | 280/204 |
| 8,091,908 | B2 * | 1/2012 | Wilson et al. | 280/204 |
| 8,376,381 | B2 * | 2/2013 | Shalaby et al. | 280/204 |
| 8,419,035 | B2 * | 4/2013 | Wilson et al. | 280/204 |
| 2004/0130117 | A1 * | 7/2004 | Lipton | 280/204 |

* cited by examiner

*Primary Examiner* — Kevin Hurley
(74) *Attorney, Agent, or Firm* — Patterson & Sheridan, LLP

(57) ABSTRACT

The present invention generally relates to a trailer for attachment to a bicycle. The trailer is designed such that when the trailer is decoupled from the bicycle, the trailer can stand without tipping over. Additionally, the coupling assembly used for coupling the trailer to the bicycle, together with the handle assembly, can collectively pivot about the trailer frame to permit the trailer to be easily maneuvered by the rider once the trailer has been decoupled from the bicycle.

19 Claims, 5 Drawing Sheets

DROP-DOWN BICYCLE TRAILER

CROSS-REFERENCE TO RELATED APPLICATIONS

This application claims benefit of U.S. Provisional Patent Application Ser. No. 61/705,651, filed Sep. 26, 2012, which is herein incorporated by reference.

BACKGROUND OF THE INVENTION

1. Field of the Invention

Embodiments of the present invention generally relate to a trailer for attachment to a bicycle.

2. Description of the Related Art

Bicycles are experiencing a renaissance with more and more people riding bicycles not just for exercise purposes, but as a mode of transportation. Many towns are 'bike-friendly' by developing and maintaining bicycle paths as well as portions of roadways. It is not uncommon to encounter a person riding a bicycle on a busy road.

Many of these bicycle riders wear backpacks to transport small items, such as books, to and from locations. However, transporting larger items that don't traditionally fit into a backpack can be quite cumbersome. In the past, some cyclists have installed a basket on the front of the bicycle. Unfortunately, the basket has limited storage space and, perhaps more importantly, is typically fixed to the bicycle in such a manner that the basket is not easily decoupled from the bicycle. Due to the difficulty in removing the basket, and what some cyclists consider to be an unsightly appearance, many cyclists do not use a basket.

Thus, there is a need to be able to transport large items using a trailer when using a bicycle, without negatively impacting the appearance of the bicycle.

Current bicycle trailers may be grouped into one and two wheel designs. One wheel trailers perform better during riding because the wheel cambers while cornering and tracks directly behind the bicycle's rear wheel. However, whenever the trailer is decoupled from the bicycle for parking or storage, the one wheel trailer may not remain upright without constant support from the user. As can be easily imagined, removing items from the trailer can be daunting. A two wheel trailer provides stability so that the trailer remains upright while the trailer is unloaded. Unfortunately, a two wheel trailer does not camber and is thus cumbersome for the bicycle rider.

Therefore, there is a need in the art for a trailer that both cambers and remains upright when decoupled from a bicycle.

SUMMARY OF THE INVENTION

The present invention generally relates to a trailer for attachment to a bicycle. The trailer is designed such that when the trailer is decoupled from the bicycle, the trailer can stand without tipping over. Additionally, the coupling assembly used for coupling the trailer to the bicycle, together with the handle assembly, can collectively pivot about the trailer frame to permit the trailer to be easily maneuvered by the rider once the trailer has been decoupled from the bicycle.

In one embodiment, the trailer comprises: a frame assembly having a frame body; a first wheel coupled to a first end of the frame; one or more support elements coupled to the frame body such that the first wheel and the one or more support elements maintain the trailer in an upright orientation when uncoupled from a bicycle; a handle assembly movably coupled to a second end of the frame that is opposite the first end of the frame such that the handle assembly is movable independent of the frame; and a coupling assembly fixedly coupled to the handle assembly, the coupling assembly arranged to couple the trailer to a bicycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
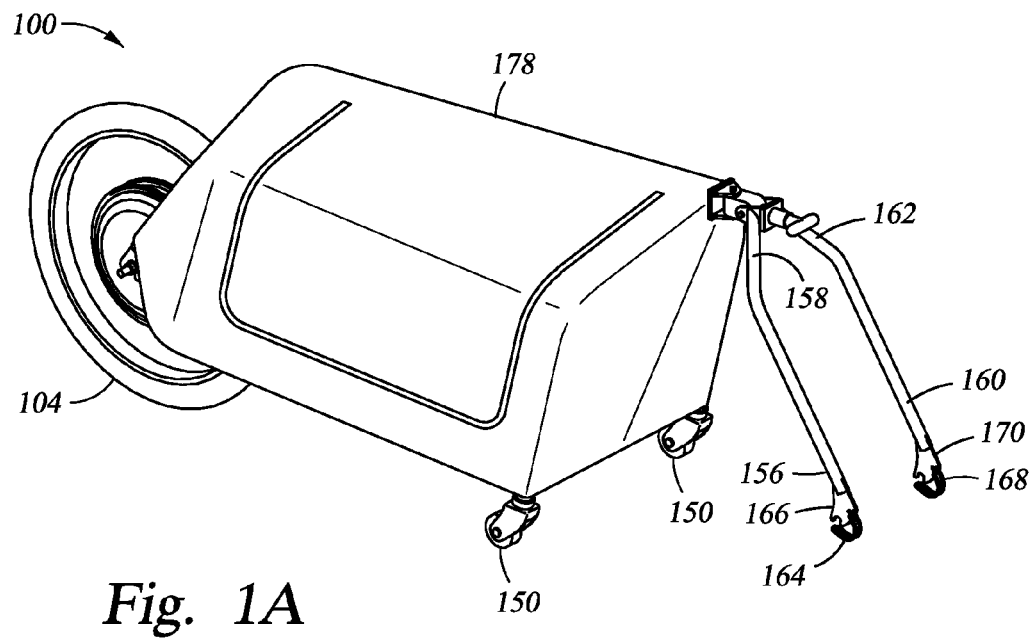
FIGS. 1A-1G are schematic illustrations of a trailer according to one embodiment of the invention.
Figure 1B:
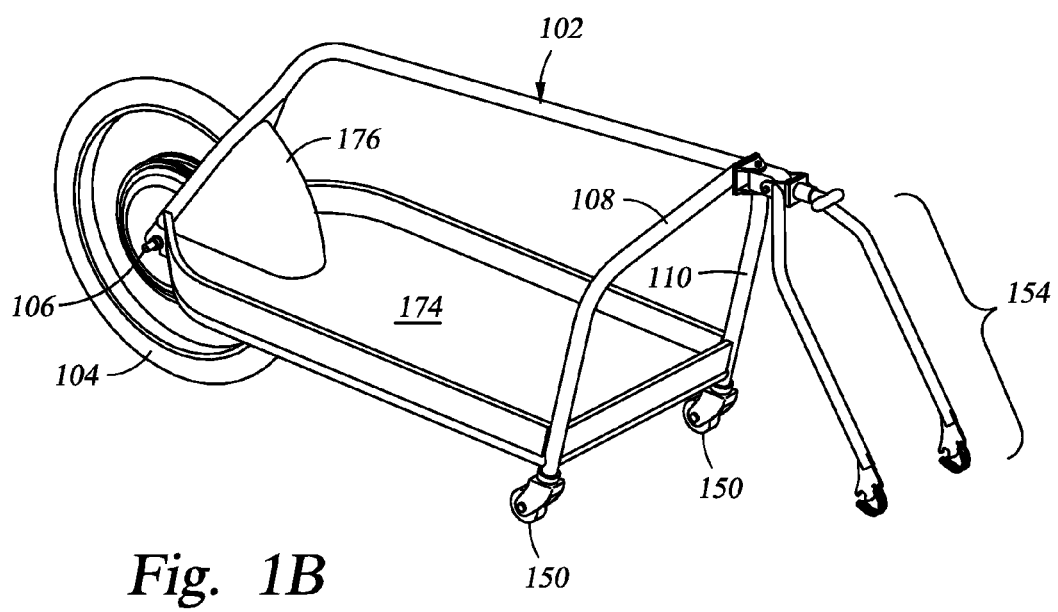
Figure 1C:
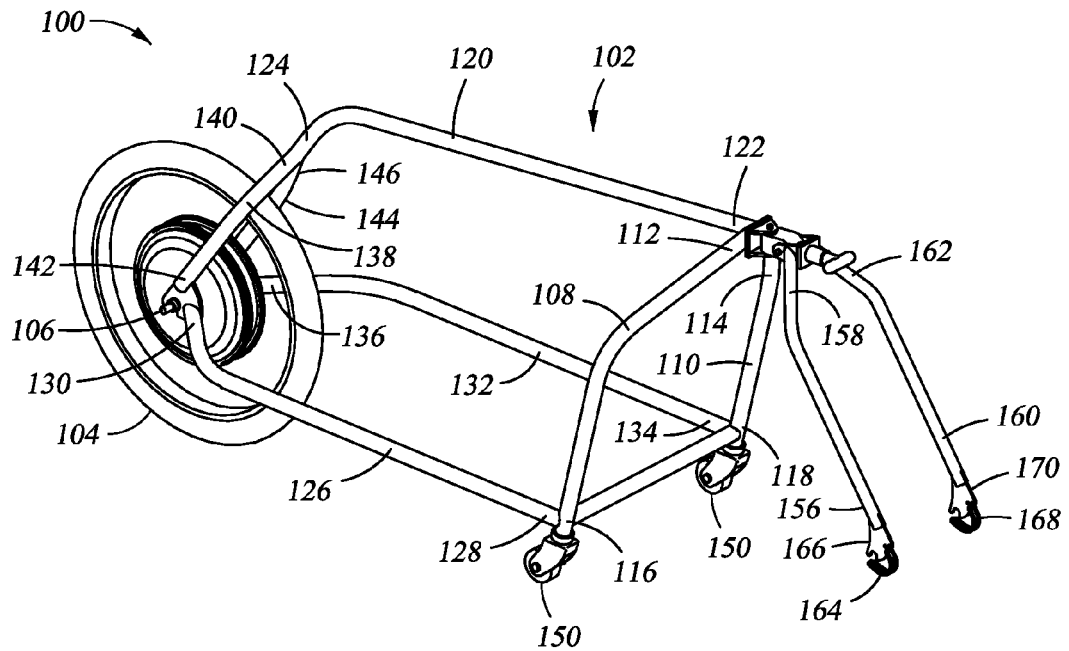
Figure 1D:
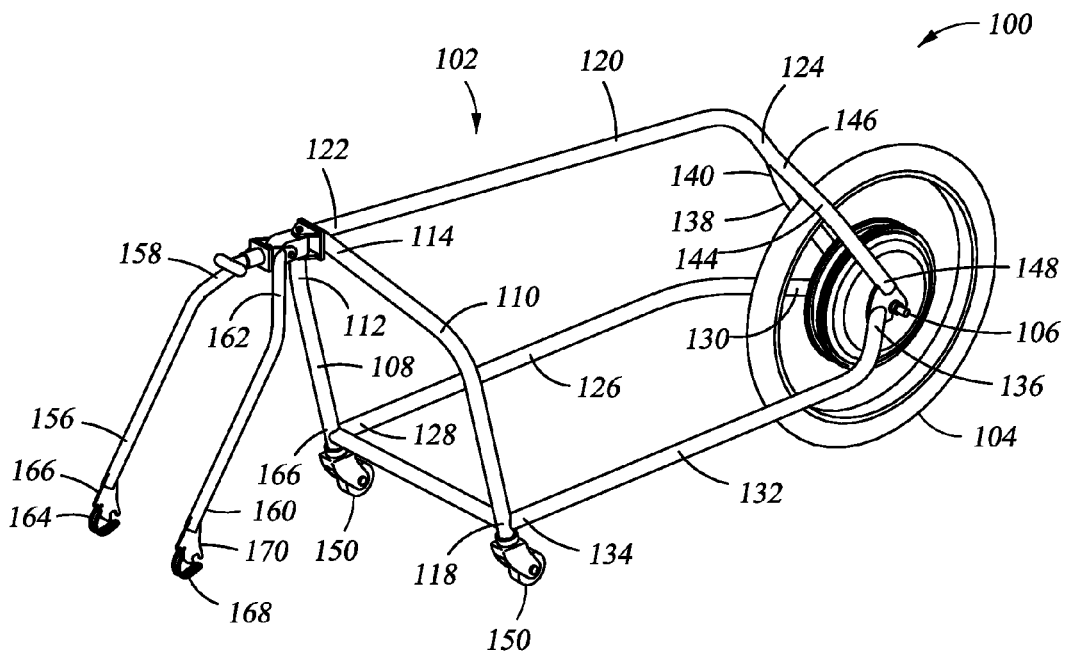
Figure 1E:
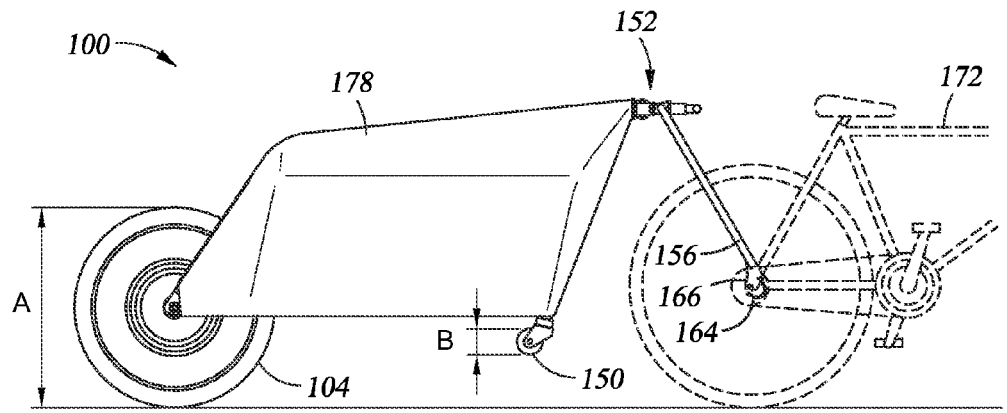
Figure 1F:
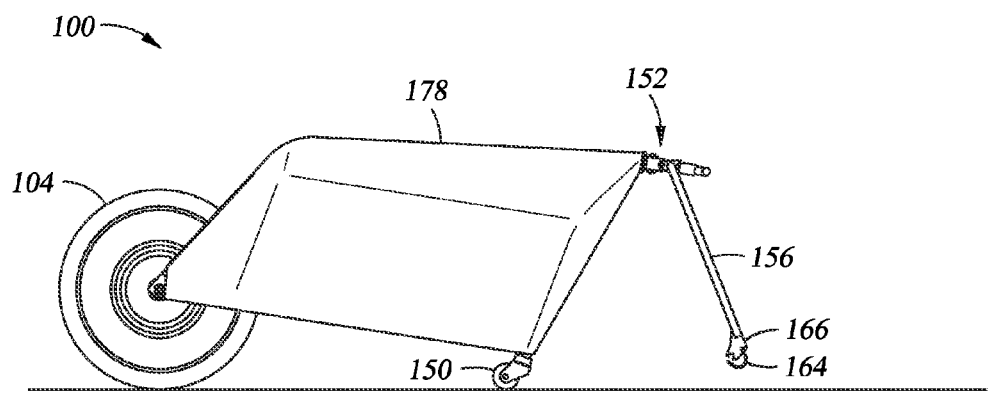
Figure 1G:
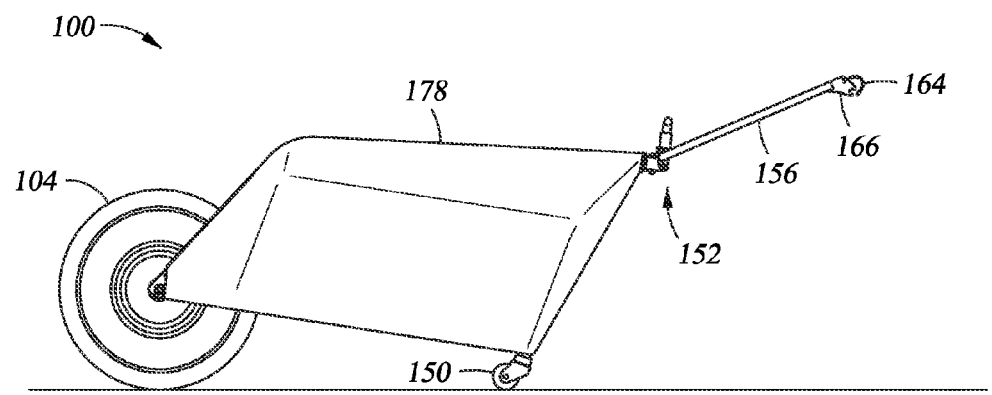

The present invention generally relates to a trailer for attachment to a bicycle. The trailer is designed such that when the trailer is decoupled from the bicycle, the trailer can stand without tipping over. Additionally, the coupling assembly used for coupling the trailer to the bicycle, together with the handle assembly, can collectively pivot about the trailer frame to permit the trailer to be easily maneuvered by the rider once the trailer has been decoupled from the bicycle.

FIGS. 1A-1G are schematic illustrations of a trailer 100 according to one embodiment of the invention. The trailer 100 comprises a frame assembly 102 having a frame body. A wheel 104 is coupled to a first end 106 of the frame body. The frame body comprises two front arms 108, 110 that each have first 112, 114 and second ends 116, 118 that are opposite the first ends 112, 114. The frame body additionally comprises a top arm 120 that has first 122 and second end 124 that is opposite the first end 122. The first end 122 of the top arm 120 is coupled to the first ends 112, 114 of the two front arms 108, 110.

The frame body also comprises a first side arm 126 that has a first end 128 and a second end 130 that is opposite the first end 128. The first end 128 of the first side arm 126 is coupled to the second end 116 of the first front arm 108. The frame body also comprises a second side arm 132 that has a first end 134 and a second end 136 that is opposite the first end 134. The first end 134 of the second side arm 132 is coupled to the second end 118 of the second front arm 110.

The frame body also comprises a first back arm 138 having a first end 140 and a second end 142 opposite the first end 140. Additionally, a second back arm 144 is present that includes a first end 146 and a second end 148 opposite the first end 146. The first ends 140, 146 of the first and second back arms 138, 144 are coupled to the second end 124 of the top arm 120. The second end 142 of the first back arm 138 is coupled to the second end 130 of the first side arm 126. Similarly, the second end 148 of the second back arm 144 is coupled to the second end 136 of the second side arm 132. The first back arm 138 and the first side arm 126 couple together at a first location where the wheel 104 is coupled thereto. The second back arm 144 and the second side arm 132 couple together at a second location where the wheel 104 is coupled thereto.

Support elements 150 are coupled to the frame body. Specifically, the support elements 150 are coupled to the second ends 116, 118 of the front arms 108, 110. In one embodiment, the support elements 150 may comprise caster wheels. It is to be understood that other support elements are contemplated. The support elements 150 maintain the trailer 100 in an upright orientation when the trailer is uncoupled from a bicycle. Additionally, after the trailer 100 has been uncoupled from a bicycle, the trailer can be independently moved by rolling the trailer 100 on the first wheel 104 and the support elements 150. Additionally, the first wheel 104 along with the support elements 150 permit the trailer 100 to stand independently of the bicycle 172.

The trailer 100 also comprises a handle assembly 152 coupled to a second end the frame body and a coupling assembly 154 coupled to the handle assembly 152. The handle assembly 152 is movably coupled to a second end of 156 of the frame body. As will be discussed below, the handle assembly 152 is movable independent of the frame body. On the other hand, the coupling assembly 154 is fixedly coupled to the handle assembly 152.

The coupling assembly 154 includes a first arm 156 having a first end 158 coupled to the handle assembly 152 and a second end 166 opposite the first end 158. Similarly, the coupling assembly 154 also includes a second arm 160 having a first end 162 coupled to the handle assembly 152 and a second end 170 opposite the first end 162. At the second end 166, 170 of each arm 156, 160, a clamp 164, 168 is present. The clamps 164, 168 are adapted to couple the coupling assembly 154, and hence, the trailer 100, to a bicycle 172.

As shown in FIGS. 1A-1G, the support elements 150 may comprise casters or wheels. The wheels or casters may have a diameter shown by arrows "B" that is less than the diameter of the wheel 104 shown by arrows "A". The support elements 150, together with the wheel 104 collectively permit the trailer 100 to stand up (i.e., not fall over) when decoupled from the bicycle 172. As specifically shown in FIGS. 1F and 1G, the trailer 100 remains standing even though the trailer 100 is not coupled to the bicycle 172.

The trailer 100 may also include a floor 174 or bottom wall that is coupled to the and second side arms 126, 132. A wheel guard 176 may also be present to shield the area inside of the frame assembly 102 from the wheel 104 and any debris that the wheel 104 might kick up when rotating. A cover 178 may also be present that substantially encloses the frame assembly 102.

Figure 2A:
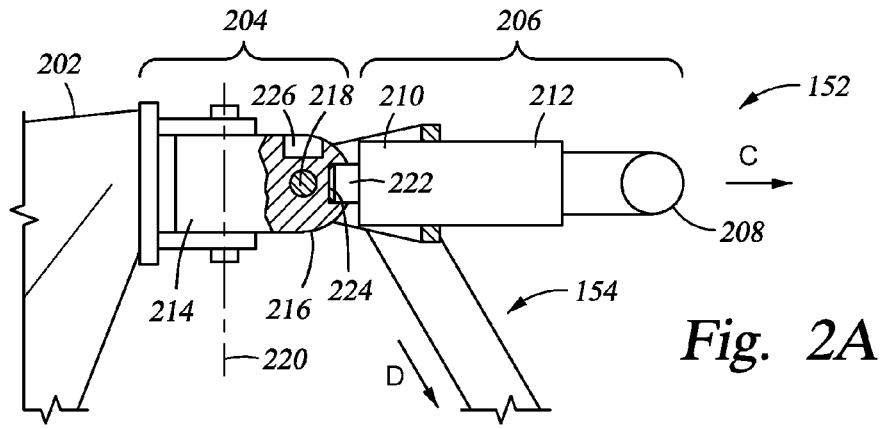
FIGS. 2A-2C are schematic illustrations of the handle for the trailer according to one embodiment.
Figure 2B:
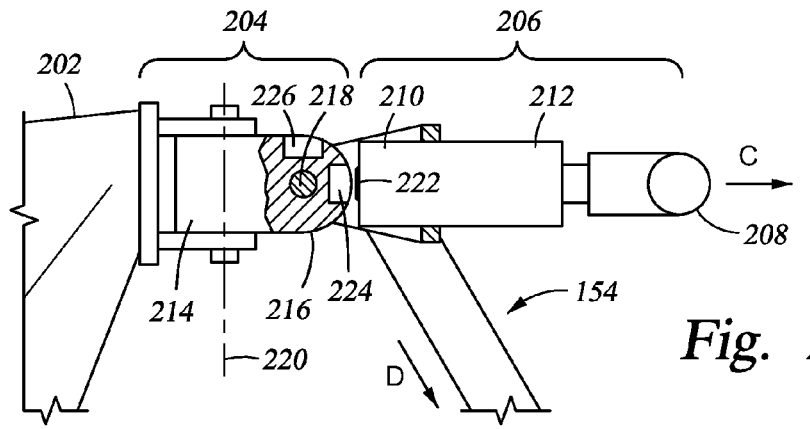
Figure 2C:
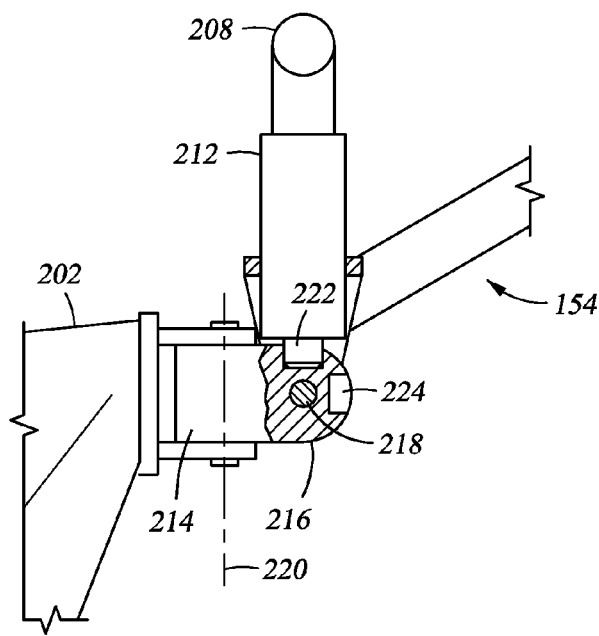

FIGS. 2A-2C are schematic illustrations of the handle assembly 152 for the trailer 100 according to one embodiment. As discussed above, the handle assembly 152 is pivotably coupled to the second end of the frame body 202. The handle assembly 152 includes a first end that is movably coupled to the frame body 202 and a second end opposite the first end such that the coupling assembly 154 is coupled to the second end of the handle assembly 152. The handle assembly 152 comprises a first handle body 206 that has a first end 210 and a second end 212 opposite the first end 210. The handle assembly 152 also includes a second handle body 204 that has a first end 214 and a second end 216 opposite the first end 214. A handle 208 is coupled to the second end 212 of the first handle body 206. As shown in FIGS. 2A-2C, the handle 208 extends from the first handle body 206 in a direction shown by arrow "C" that is different than the direction, shown by arrow "D" that the coupling assembly 154 extends from the first handle body 206.

The first end 210 of the first handle body 206 is coupled to the second end 216 of the second handle body 204 such that the first handle body 206 can rotate about an axis 218 relative to the second handle body 204. Specifically, as shown in FIGS. 2B and 2C, the first handle body 206 can move between two positions. In one position (shown in FIGS. 2A and 2B), the coupling assembly 154 is positioned to be coupled to a bicycle 172. In the second position (shown in FIG. 2C), the coupling assembly 152 is raised and may be used as a handle to maneuver the trailer 100. The first handle body 206 is movable by pulling the handle 208 to retract a pin 222 from a slot 224 and into the first handle body 206. Once the pin 222 is disengaged from the slot 224, the first handle body 206 can move relative to the second handle body 204. The first handle body 206 can be moved to a position where the pin 222 may be inserted into a second slot 226 of the second handle body 204. Whenever the pin 222 is disposed within a slot 224, 226 of the second handle body 204, the first handle body 206 is fixed relative to the second handle body 204. Whenever the pin 222 is retracted into the first handle body 206, the first handle body 206 is rotatable about the axis 218 relative to the second handle body 204. Having the pin 222 inserted into the first slot 224 permits the trailer 100 to be coupled to a bicycle 172 whereas having the pin 222 inserted into the second slot 226 permits the trailer 100 to be easily maneuvered when decoupled from the bicycle 172.

The second handle body 204 is rotationally coupled to the frame body 202 about a second axis 220 that is substantially perpendicular to the first axis 218. The rotation about the second axis 220 permits the trailer 100 more easily follow the bicycle 172 when coupled thereto, especially whenever the bicycle 172 makes a turn.

Figure 3A:
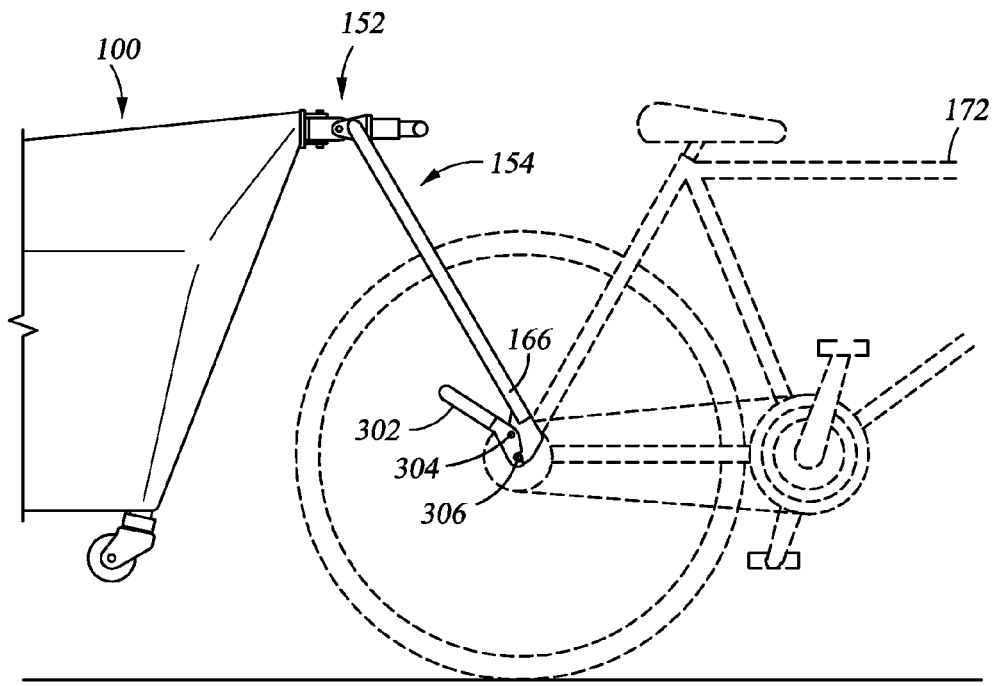
FIGS. 3A-3C illustrate a clamping mechanism for coupling the trailer to a bicycle according to another embodiment.
Figure 3B:
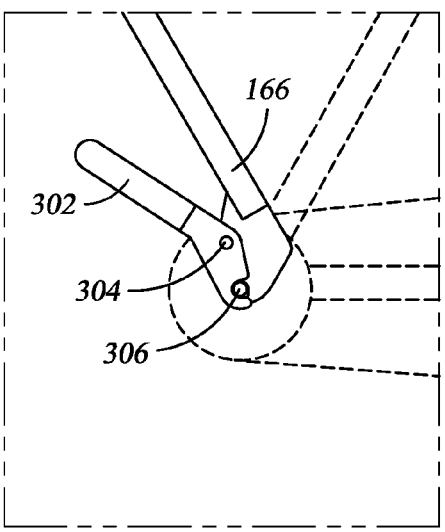
Figure 3C:
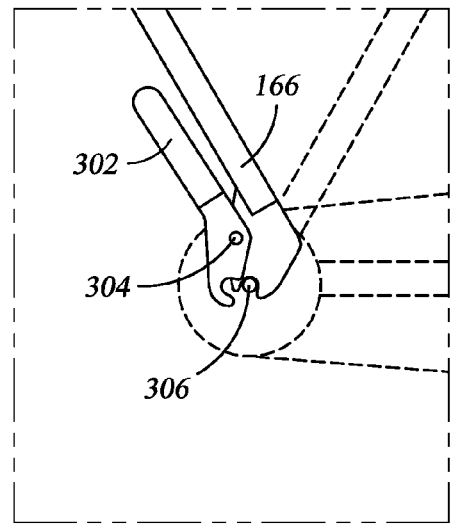

FIGS. 3A-3C illustrate a clamping mechanism for coupling the trailer 100 to a bicycle 172 according to another embodiment. In the embodiment shown in FIGS. 3A-3C, a clamp 302 is coupled to the second end 166 of the arm 154. The clamp 302 may be spring loaded such that the clamp 302 pivots about an axis 304 to permit attachment to (FIG. 3B) and removal from (FIG. 3C) the bicycle 172. The end of the clamp 302 pinches the bicycle axis 306 to fixedly attach the trailer 100 to the bicycle 172.

The coupling assembly 154, due to the connection to the first handle body 206, can be in a raised position (shown in FIG. 2C) and dropped down into a lowered position (shown in FIGS. 2A and 2B). The lowered position is the position used to couple the trailer 100 to a bicycle 172. The raised position permits the trailer 100 to be maneuvered independent from the bicycle 172. When the trailer 100 is coupled to the bicycle 172, the trailer 100 can support the bicycle 172. Normally, the bicycle 172 has a kickstand to support the bicycle 172 when the rider has dismounted. However, the support elements 152 on the trailer act can as a defacto kickstand such that the trailer 100 supports the bicycle 172 once the rider has dismounted. The handle 208 may be disengaged from the slot 224 so that the first handle body 206 rotates about the axis 218, even though the trailer 100 is coupled to the bicycle 172. Because the first handle body 206 rotates about the axis 218, the frame body 202 lowers to the ground until the support elements 152 touch the ground. Once on the ground, the support elements 152, together with the wheel 104, make the trailer 100 self supporting. Because the bicycle 172 is still coupled to the trailer 100, the bicycle will remain upright as well. Thus, the kickstand is irrelevant whenever the trailer 100 is coupled to the bicycle 172.

The second axis 220 permits the trailer 100 to camber with the bicycle 172 when coupled to the bicycle 172. The support elements 152 permit the trailer 100 to remain upright when decoupled from a bicycle 172. Thus, the trailer 100 discussed herein is beneficial to bicycle riders by providing both a trailer that remains upright when decoupled from the bicycle as well as the benefits of a trailer that cambers. Additionally, the unique handle assembly 152 permits easy maneuvering of the trailer 100 when decoupled from the bicycle 172 such that the trailer 100 can be easily maneuvered to a storage location.

While the foregoing is directed to embodiments of the present invention, other and further embodiments of the invention may be devised without departing from the basic scope thereof, and the scope thereof is determined by the claims that follow.

The invention claimed is:

1. A trailer, comprising:
a frame assembly having a frame body;
a first wheel coupled to a first end of the frame body;
one or more support elements coupled to the frame body such that the first wheel and the one or more support elements maintain the trailer in an upright orientation when uncoupled from a bicycle;
a handle assembly movably coupled to a second end of the frame that is opposite the first end of the frame such that the handle assembly is movable independent of the frame body; and
a coupling assembly fixedly coupled to the handle assembly, the coupling assembly arranged to couple the trailer to a bicycle, wherein the coupling assembly comprises:
a first arm having a first end coupled to the handle assembly; and
a second arm having a first end coupled to the handle assembly.

2. The trailer of claim 1, wherein the first wheel has a first diameter and wherein the one or more support elements comprise one or more second wheels that each have a second diameter that is less than the first diameter.

3. The trailer of claim 1, wherein the handle assembly is pivotably coupled to the second end.

4. The trailer of claim 1, wherein the coupling assembly further comprises:
a first clamp coupled to the first arm at a second end of the first arm that is opposite the first end of the first arm; and
a second clamp coupled to the second arm at a second end of the second arm that is opposite the first end of the second arm.

5. The trailer of claim 4, wherein the first clamp and the second clamp are adapted to couple to an axle of a bicycle between a respective clamp and arm of the coupling assembly.

6. The trailer of claim 1, wherein the handle assembly comprises a handle body having a first end movably coupled to the frame body and a second end opposite the first end, wherein the coupling assembly is coupled to the second end.

7. The trailer of claim 6, further comprising a handle coupled to the second end of the handle assembly.

8. The trailer of claim 7, wherein the handle extends from the handle body in a first direction and the coupling assembly extends from the handle body in a second direction that is different than the first direction.

9. The trailer of claim 1, wherein the handle assembly comprises:
a first handle body having a first end and a second end opposite the first end;
a second handle body having a first end and a second end opposite the first end, wherein the first end of the first handle body and the second end of the second handle body are coupled together, wherein the coupling assembly is coupled to the first handle body, and wherein the first end of the second handle body is coupled to the frame body.

10. The trailer of claim 1, further comprising a cover coupled with the frame assembly.

11. The trailer of claim 10, wherein the cover substantially encloses the frame assembly.

12. A trailer, comprising:
a frame assembly having a frame body;
a first wheel coupled to a first end of the frame body;
one or more support elements coupled to the frame body such that the first wheel and the one or more support elements maintain the trailer in an upright orientation when uncoupled from a bicycle;
a handle assembly movably coupled to a second end of the frame that is opposite the first end of the frame such that the handle assembly is movable independent of the frame body; and
a coupling assembly fixedly coupled to the handle assembly, the coupling assembly arranged to couple the trailer to a bicycle, wherein the handle assembly comprises:
a first handle body having a first end and a second end opposite the first end;
a second handle body having a first end and a second end opposite the first end, wherein the first end of the first handle body and the second end of the second handle body are coupled together, wherein the coupling assembly is coupled to the first handle body, and wherein the first end of the second handle body is coupled to the frame body, wherein the first end of the first handle body is rotationally coupled to the second end of the second handle body about a first axis.

13. The trailer of claim 12, wherein the first end of the second handle body is rotationally coupled to the frame body about a second axis.

14. The trailer of claim 13, wherein the first axis is substantially perpendicular to the second axis.

15. The trailer of claim 14, further comprising a handle coupled to the second end of the first handle body, wherein the handle is movable relative to the first handle body and the second handle body.

16. The trailer of claim 15, wherein the handle is movable between a first position in contact with the second handle body to prevent movement of the first handle body relative to the second handle body, and a second position spaced from the second handle body to permit movement of the first handle body relative to the second handle body.

17. A trailer, comprising:
a frame assembly having a frame body;
a first wheel coupled to a first end of the frame body;
one or more support elements coupled to the frame body such that the first wheel and the one or more support elements maintain the trailer in an upright orientation when uncoupled from a bicycle;
a handle assembly movably coupled to a second end of the frame that is opposite the first end of the frame such that the handle assembly is movable independent of the frame body; and
a coupling assembly fixedly coupled to the handle assembly, the coupling assembly arranged to couple the trailer to a bicycle, wherein the frame body comprises:
a first front arm having a first end and a second end opposite the first end;
a second front arm having a first end and a second end opposite the first end;

a top arm having a first end and a second end opposite the first end, wherein the first end of the first front arm is coupled to the first end of the second front arm and to the first end of the top arm;

a first side arm having a first end and a second end opposite the first end, wherein the first end of the first side arm is coupled to the second end of the first front arm;

a second side arm having a first end and a second end opposite the first end, wherein the first end of the second side arm is coupled to the second end of the second front arm;

a first back arm having a first end and a second end opposite the first end, wherein the second end of the first back arm is coupled to the second end of the first side arm at a first location;

a second back arm having a first end and a second end opposite the first end, wherein the first end of the first back arm is coupled to the second end of the top arm and to the first end of the second bark arm, and wherein the second end of the second back arm is coupled to the second end of the second side arm at a second location.

18. The trailer of claim 17, wherein the first wheel is coupled to the frame body at the first location and the second location.

19. The trailer of claim 18, further comprising a bottom wall coupled between the first side arm and the second side arm.

* * * * *